United States Patent [19]

Dyer et al.

[11] Patent Number: 4,630,285

[45] Date of Patent: Dec. 16, 1986

[54] METHOD FOR REDUCING GROUP DELAY DISTORTION

[75] Inventors: James W. Dyer, Laurel; Raymond R. Watkins, Ellicott City, both of Md.

[73] Assignee: The United States of America as represented by the Director of the National Security Agency, Washington, D.C.

[21] Appl. No.: 712,934

[22] Filed: Mar. 18, 1985

[51] Int. Cl.⁴ .............................................. H04L 27/00
[52] U.S. Cl. ................................... 375/37; 333/28 R; 328/162
[58] Field of Search ..................... 375/25, 26, 37, 96, 375/103; 340/347 AD, 347 DA; 364/484, 485, 724, 825; 333/28 R, 165; 328/162, 138; 358/13, 19; 370/10, 18, 50, 70

[56] References Cited

U.S. PATENT DOCUMENTS

| | | | |
|---|---|---|---|
| 2,669,608 | 2/1954 | Goodall | 375/26 |
| 3,404,231 | 10/1968 | Aaron et al. | 375/25 |
| 3,629,509 | 12/1971 | Glaser | 364/724 |
| 4,032,762 | 6/1977 | Caloyannides | 364/724 |
| 4,093,989 | 6/1978 | Flink et al. | 364/485 |
| 4,317,129 | 2/1982 | Favreau | 358/13 |
| 4,463,371 | 7/1984 | Lewis, Jr. | 358/19 |
| 4,468,794 | 8/1984 | Waters et al. | 375/103 |
| 4,520,386 | 5/1985 | Asaida | 358/13 |
| 4,534,043 | 8/1985 | Krishnan | 364/724 |

*Primary Examiner*—Robert L. Griffin
*Assistant Examiner*—Stephen Chin
*Attorney, Agent, or Firm*—Thomas O. Maser; John R. Utermohle

[57] ABSTRACT

A method is disclosed for eliminating group delay distortion resulting from filtering an information-carrying analog signal. The method allows an analog signal to be converted to digital form and back again with zero group delay distortion. The analog signal is first band or low pass filtered with a filter having a pass band substantially larger than that required to filter only the signal of interest. The filtered signal is then digitized at a rate appropriate to the filtered signal, digitally filtered to remove all but the signal of interest, and down sampled to the transmission rate. A substantially reversed process is described for reconverting the digital signal to analog form. The method is shown to be equally effective with a multiplexed signal.

6 Claims, 22 Drawing Figures

METHOD FOR REDUCING GROUP DELAY DISTORTION

BACKGROUND OF THE INVENTION

1. Field of the Invention

Our invention relates to the field of communications, and more particularly, to reduction or elimination of group delay distortion resulting from filtering an information carrying analog signal

2. Description of the Prior Art

When an analog signal is digitized, it is common to take samples at a rate somewhat greater than twice the bandwidth of the signal. Because the transmission bit rate is proportional to the sampling rate, a low sampling rate is usually selected. In order to make digitization more accurate, the analog signal is first filtered to remove all frequency components except those of the desired signal. However, when the analog signal is filtered it undergoes a time delay. Over a large portion of the middle of the pass band, this delay is essentially constant. Approaching the edges of the pass band, however, the delay begins to drop off rapidly and a frequency dependent variation in the delay is introduced.

FIG. 1 illustrates a representative delay curve for an analog Bessel low pass filter having a cutoff frequency of 3200 hz. From this curve it is apparent that the time delay is relatively constant between 0 and 2000 hz. At frequencies near the cutoff, however, the delay has begun to drop and is measurably less than it was below 2000 hz. The Bessel Filter has delay characteristics which are much better than those of other well known filters. All analog filters, however, exhibit this undesirable feature to some extent. This phenomena, wherein some portions of the frequency spectrum have greater time delay than others, is referred to as group delay distortion or differential time delay. It obviously constitutes a degrading of the original signal and is not normally desirable. Because nearly all analog signal processing includes filtering, group delay distortion is a pervasive problem, the undesirable effects of which are magnified whenever multiple filtering steps are required.

Digital communications technology is more readily capable of signal processing without introduction of differential group delay. If the signal to be processed is initially in analog form, however, the very act of digitization of the signal will result in unwanted distortions. Conversion of the digital signal back into its original form will introduce still further differential time delay. It is desirable to eliminate all such delays from analog signal processing. Our invention achieves this result by a novel process which utilizes two known concepts, i.e., (1) it is relatively simple to construct analog filters which have almost no differential group delay at frequencies which are not near the band edges of the filter, and (2) digital filters may be relatively easily implemented with no differential time delay.

SUMMARY OF THE INVENTION

We have discovered a method for processing an analog signal, and an apparatus for carrying out this process, which allows filtering without introduction of differential time delays. In particular, the method allows an analog signal to be converted to digital form and back again with zero group delay distortion.

Accordingly, it is an object of our invention to provide a method which overcomes the above-cited disadvantages of the prior art.

It is a further object to filter a message signal without introduction of appreciable differential time delay.

Still another object is to provide an apparatus capable of filtering a message signal without introduction of appreciable differential time delay.

A still further object is to convert an analog signal to digital form or a digital signal to analog form without introducing group delay distortion.

Another object is to provide a signal modulator and demodulator which relatively cheaply filters the baseband signal without introduction of differential time delay.

A method of signal processing having these and other desirable features would include the steps of: filtering an analog signal with an analog filter having a pass band substantially wider than the bandwidth of the signal; digitizing said filtered signal at a second bit rate substantially greater than said first bit rate; filtering said digital signal with a digital filter having a pass band substantially equal to said given bandwidth, and downsampling said filtered digital signal to said first bit rate.

BRIEF DESCRIPTION OF THE DRAWINGS

The discussion of our invention which follows may be more easily understood when the description is read with reference to the accompanying figures, in which:

FIG. 2 is a block diagram of a communications system typical of the prior art for digitizing and transmitting an audio signal. An audio signal is provided by a source 13 to a low pass or band pass filter 14. For purposes of illustration it might be assumed that the audio signal source is a radio operator speaking into a microphone. Typically, such a signal might be filtered with an analog low pass filter having a cutoff frequency of approximately 3.2 Khz. In the alternative, filter 14 might be a band pass filter having cutoff frequencies of 200 hz and 3.2 Khz. The filtered signal is sampled by an analog-to-digital (A/D) converter 15 at a rate which is determined by a clock 18. The result might be an 8-bit per sample data stream of 8000 samples per second. Many sampling techniques exist in the prior art for performing the A/D conversion. Pulse amplitude modulation is one example of such a well known technique. The 64K bit per second (b/s) signal is transmitted by any conventional transmitter 19 over a communications channel 20 to a receiver 23. At the receive end of the channel, receiver 23 routes the digital signal to a synchronizer circuit 24 which is controlled by pulses from a clock 25. A digital-to-analog (D/A) converter 28 and a low pass filter 29 reconstruct the desired audio signal which may be provided to an output device 30.

Referring to FIG. 3, there is illustrated an improved communications system which incorporates the desirable features of our invention. A source 43 provides an analog signal to a low pass filter 44. For purposes of illustration, it will be assumed that the signal is a conventional voice frequency audio signal. In our invention, filter 44 is given a cutoff frequency substantially higher than that found in the low pass filter 14 of the prior art. More specifically the pass band of filter 44 is made wide enough to insure that no group delay distortion is introduced into the critical portion of the signal. In the present example, a pass band on the order of 7 Khz meets this requirement. The group delay characteristics for a representative 7 Khz low pass filter are illustrated in FIG. 5. Because the analog filter passes a much greater bandwidth than the signal of interest, i.e., 200–3200 hz, the group delay characteristic within the band of interest can easily be made constant to within a high degree of accuracy. An A/D converter 45 digitizes the resultant signal at a rate sufficiently high to prevent aliasing of the signal. A rate of 16 Khz serves well in the specific example of this embodiment. The signal is next passed through a symmetrical finite impulse response (FIR) low-pass filter 48 with an upper cutoff frequency of 3.2 Khz. The symmetrical FIR filter is a well known device, the construction of which is well within the knowledge of those skilled in the digital communications arts. Examples of representative FIR filters may be found in U.S. Pat. Nos. 4,468,794 to Waters et al. and 4,463,371 to Lewis, Jr. The resulting 16K sample digital signal from filter 48 signal is then downsampled to create an 8K sample digital signal. This is sent over communications channel 49 to receiver 50. Each of the individual processing steps carried out by A/D converter 45, digital filter 48, and down sampler 47 are well known and conventional, and may be performed under the control of a microprocessor represented as control 46.

A substantially reverse process at the receive end of the system reconverts the signal to analog form. The 8 Khz digital stream from receiver 50 is first converted to a 16 Khz digital stream by inserting a zero sample between each sample taken from the digital channel. This data stream is digitally low-pass filtered in FIR filter 54 to remove all components above the 3.2 Khz cutoff frequency. The resulting signal is then D/A converted with circuit 55 at a 16 Khz rate and passed through a 7 Khz analog low-pass filter 58. As at the transmit end, this low pass filter introduces negligble group delay in the band of interest. In fact, however, the digital filters in the system can easily be designed with nonsymmetrical coefficients to compensate for even the minute differential group delay distortion introduced by the analog filters in the system.

Figure 4:
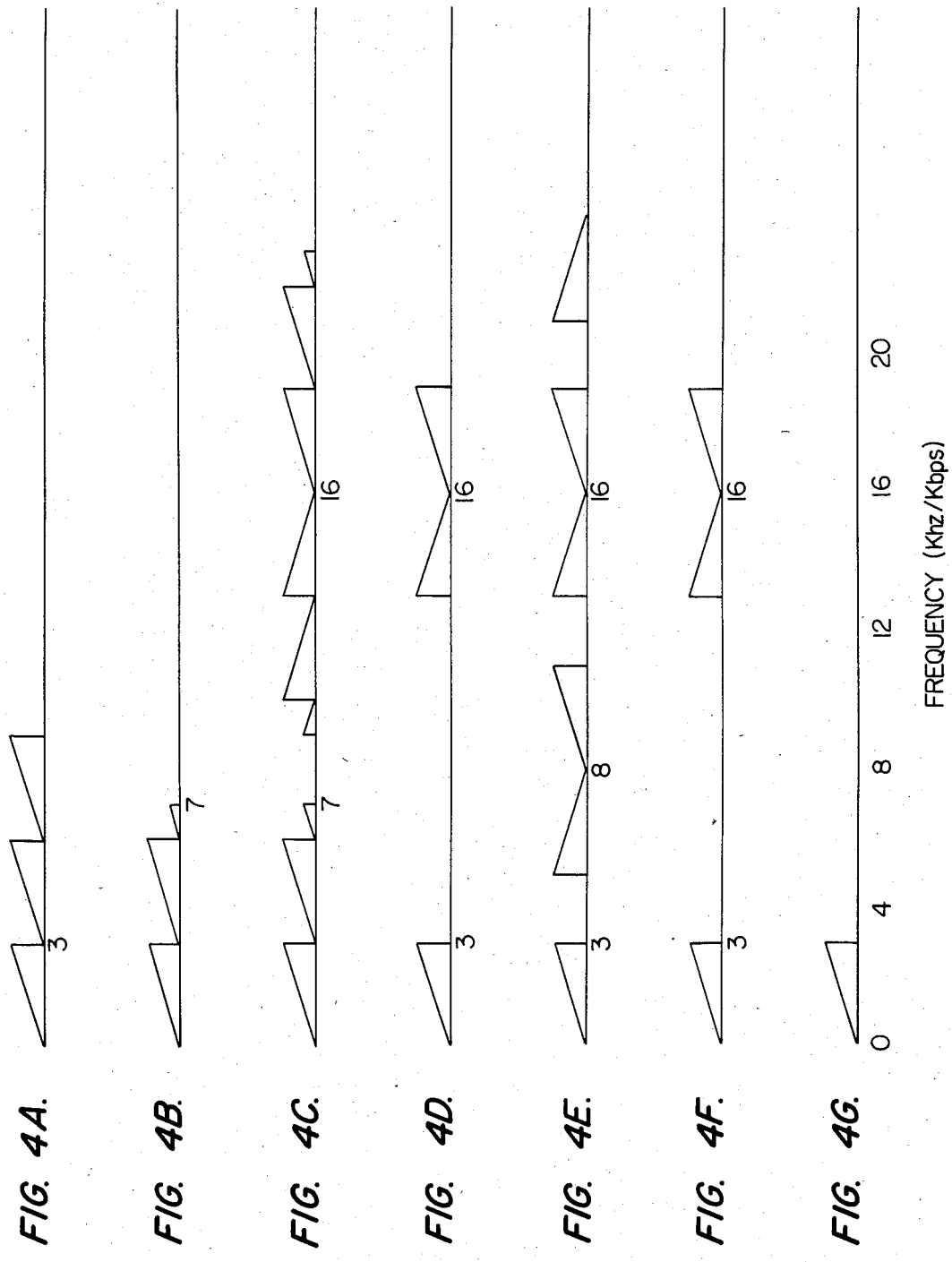
FIGS. 4A-4G illustrate a sequence of spectral plots at various points of our invention.
Figure 5:
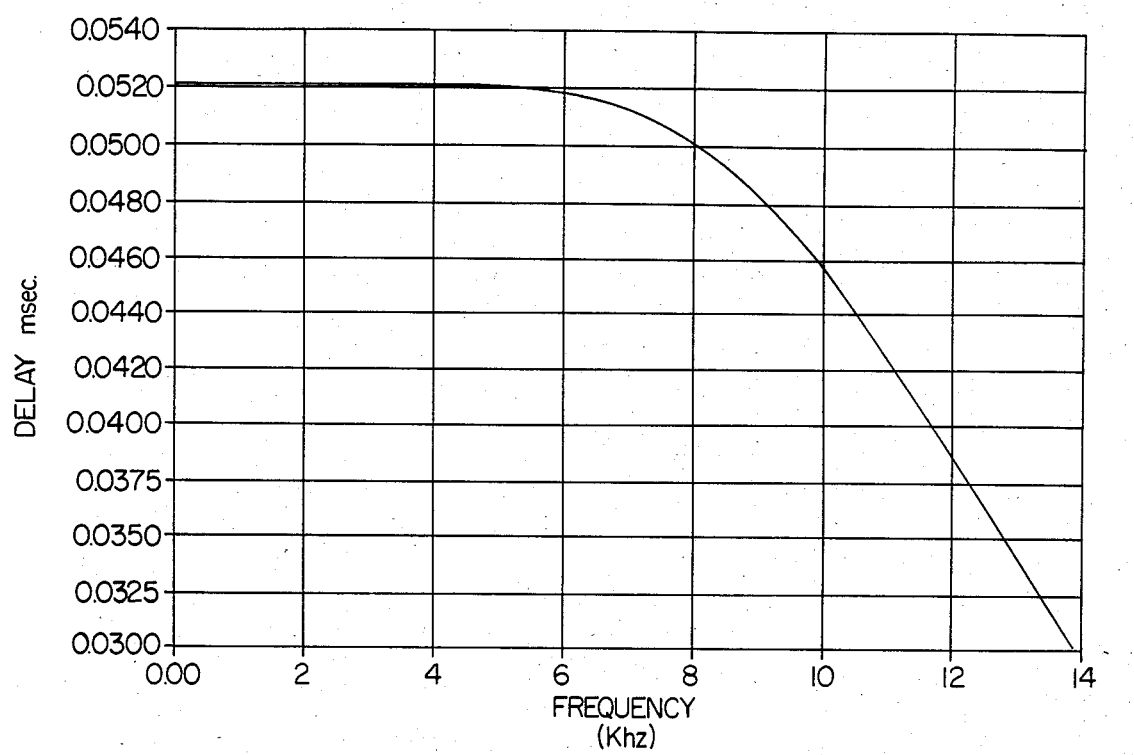
FIG. 5 is a representative curve illustrating the time delay characteristics of a 7000 hz low pass filter.

The operation of our invention will now be explained, with reference to the frequency spectrum plots of FIG. 4. Let the signal from audio source 43 be represented by the plot of FIG. 4A. Low pass filter 44, which has a 7 Khz cutoff frequency, passes that portion of the original signal which is below 7 Khz. FIG. 4B illustrates the filtered signal as it approaches A/D converter 45. It should be reemphasized that the signal of interest is only that portion of the filtered signal which lies between 200 hz and 3.2 Khz. Little or no differential group delay is introduced into that portion of the passed signal, even though such delay would exist in the portion of the filtered signal nearer to the cutoff frequency.

Control 46 provides 16 Khz clock pulses to A/D converter 45. The resulting digital signal is represented by the curve of FIG. 4C. Because the signal is digital, its spectrum would repeat at 16 Khz intervals. Digital filter 48, with a passband of 0–3.2 Khz, filters the signal with the result shown in FIG. 4D. Filtering with a symmetrical FIR filter introduces no group delay distortion, as was previously stated. That portion of the frequency spectrum between 0 and 3.2 Khz is a digital equivalent of the original analog input signal, with no differential group delay added. This 16K sample digital signal, however, need not be transmitted at such a high bit rate. It is thus down sampled to an 8K sample rate prior to being sent by transmitter 51 over communication channel 49 to receiver 50. The curve of FIG. 4E illustrates the signal as it is transmitted to, and received by, the receiver 50. As an 8K sample signal, it obviously repeats in the frequency spectrum at 8 Khz intervals.

Up sampler 53 receives incoming data from receiver 50 and timing information from control 59. A zero-value sample is interspersed between each incoming data sample to double the sample rate. Digital to analog converter 55, under the control of controller 59, converts the digital signal back to an analog signal. Finally, this signal is passed through the 7 Khz low pass filter 58 to yield the reproduced original signal as illustrated in FIG. 4G. As was the case with filter 48, filter 58 introduces measurable differential time delay at the higher frequencies of the pass band (eg. 5–7 Khz). Because the frequencies of interest lie only within the 200 hz to 3.2 Khz band, no group delay distortion is present on the signal.

In a second embodiment of our invention, the techniques described hereinabove may be used to demultiplex, or dechannel, an individual channel of a frequency division multiplexed (FDM) signal without introducing group delay distortion into the dechanneled signal. For example, let it be assumed that only a single channel of an FDM signal is to be provided to some remote location. Using presently known methods, selecting a single channel from a group of narrow band channels involves tuning a receiver to the channel of interest and down-converting this channel to baseband.

Figure 1:
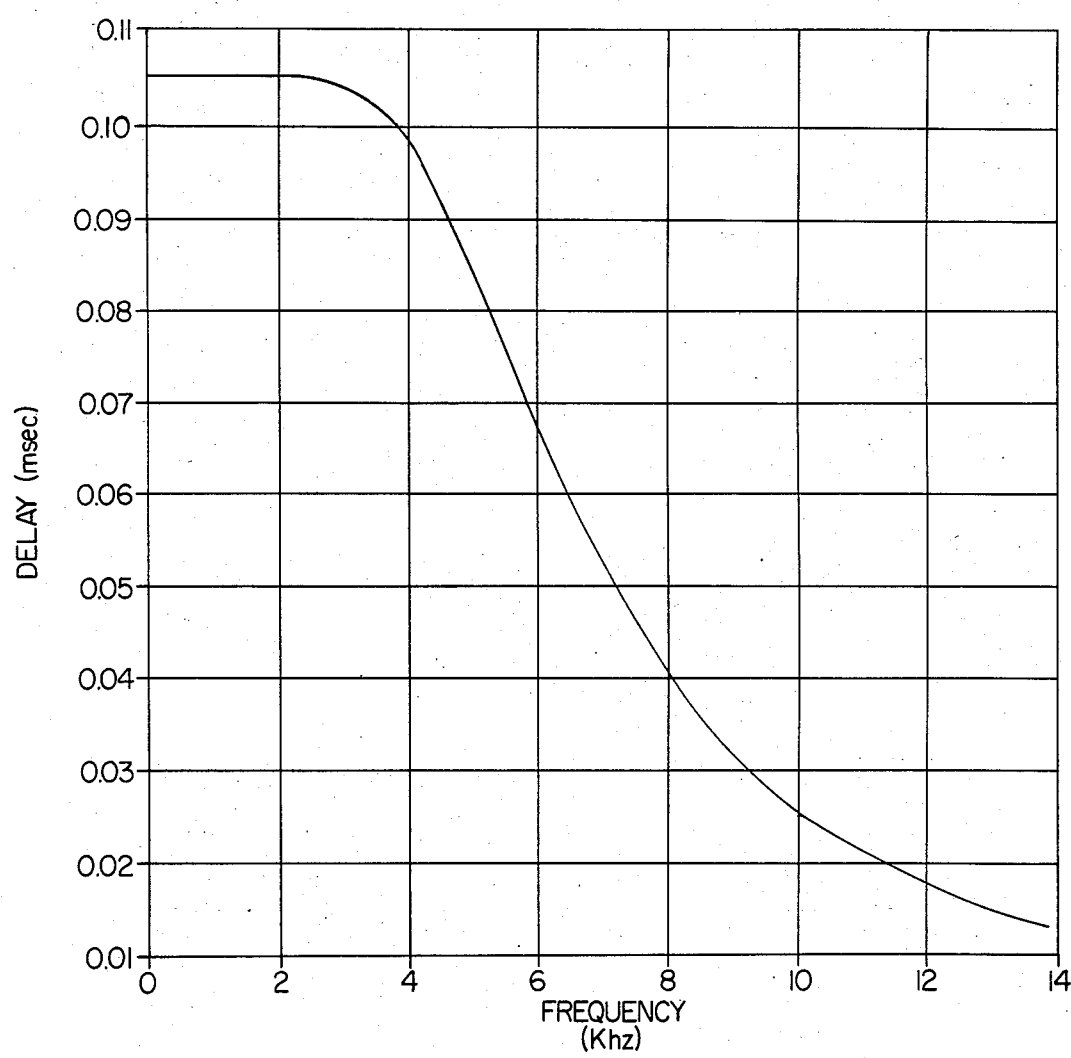
FIG. 1 is a representative curve illustrating the time delay characteristics of a 3200 hz Bessel low pass filter.
Figure 2:
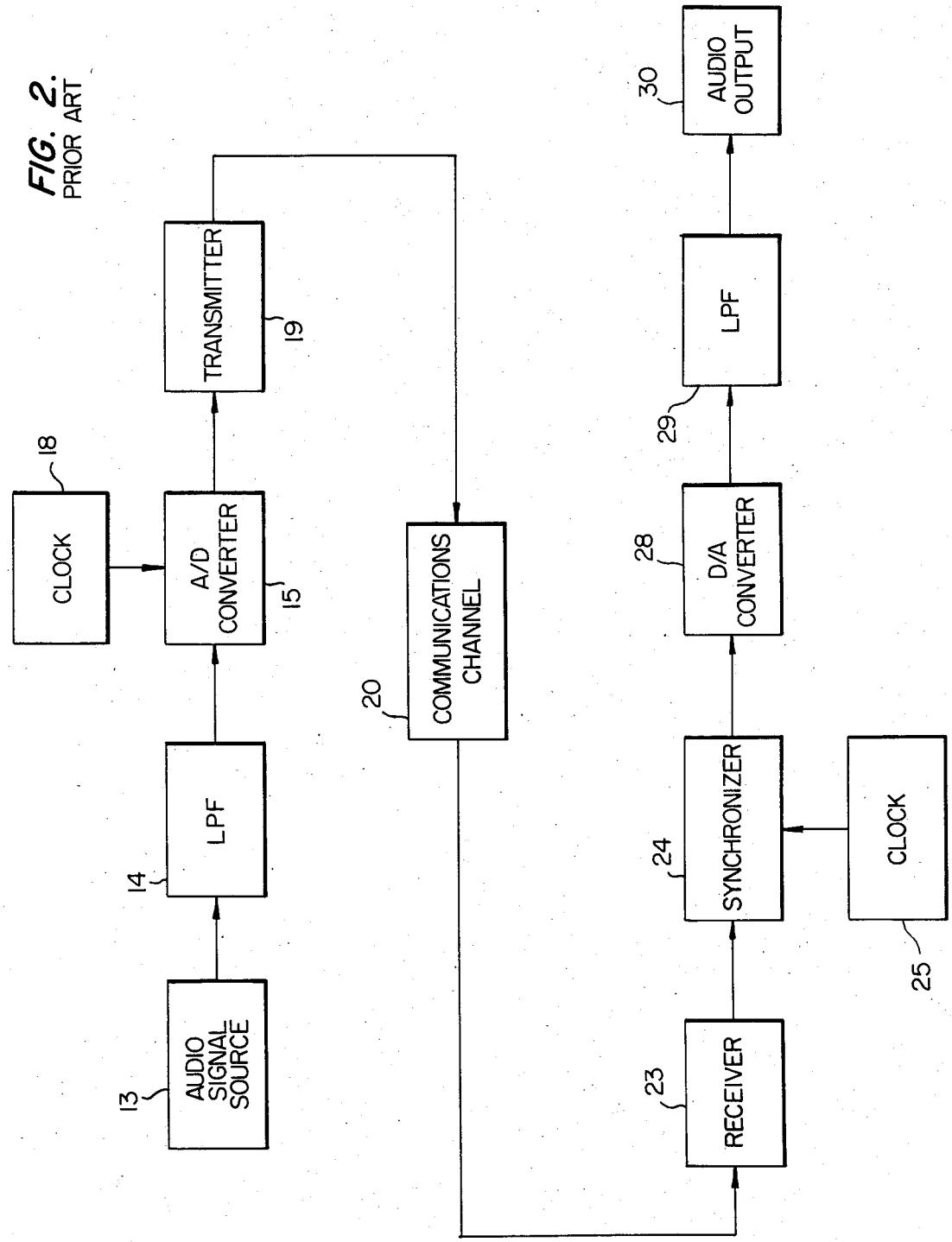
FIG. 2 is a block diagram of a communications system representative of the prior art.
Figure 6:
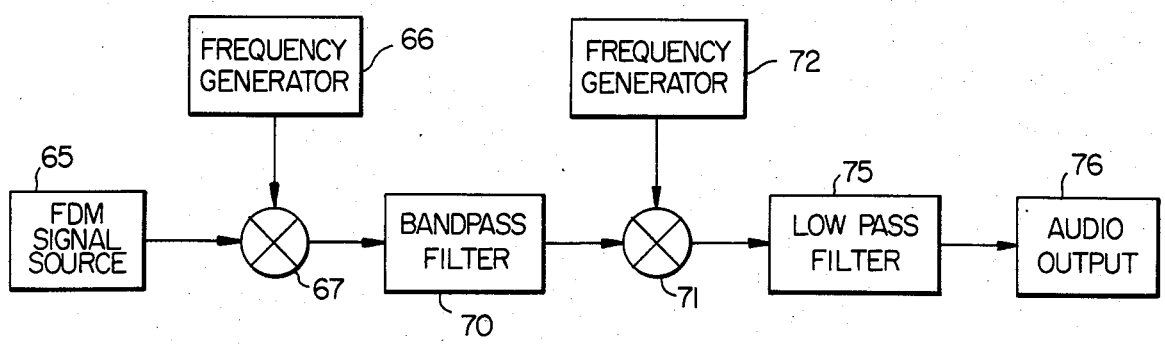
FIG. 6 is a block diagram of an analog dechanneler circuit representative of the prior art.

FIG. 6 is a block diagram of a dechanneler circuit typical of the prior art. An FDM signal from a source 65 is first applied to a modulator 67. A modulating signal from frequency generator 66 translates the center frequency of the desired channel to the center frequency of bandpass filter 70. A second signal from frequency generator 72 is applied to modulator 71. This modulating frequency is selected to downconvert the previously filtered channel to its baseband frequency, where it is filtered by lowpass filter 75. The resulting single channel, at audio output 76 may then be applied as the input from audio signal source 13 of FIG. 1. Each analog filtering step of this process introduces undesirable group delay distortion. By using the principles of our invention, however, the process of communicating the dechanneled signal without introduction of group dela distortion may be achieved.

Figure 7:
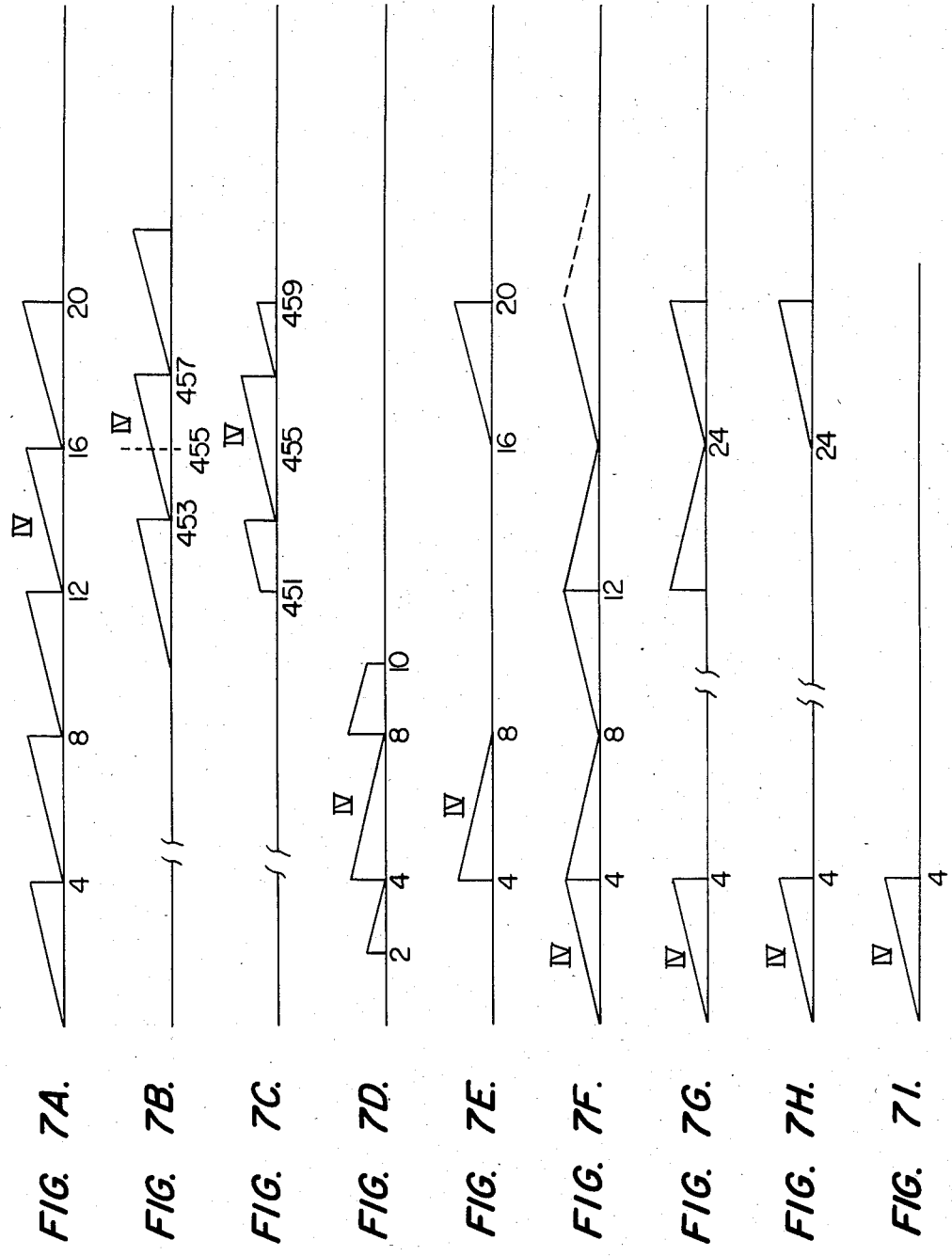
FIGS. 7A-7I illustrate a sequence of spectral plots at various points of our invention.
Figure 8:
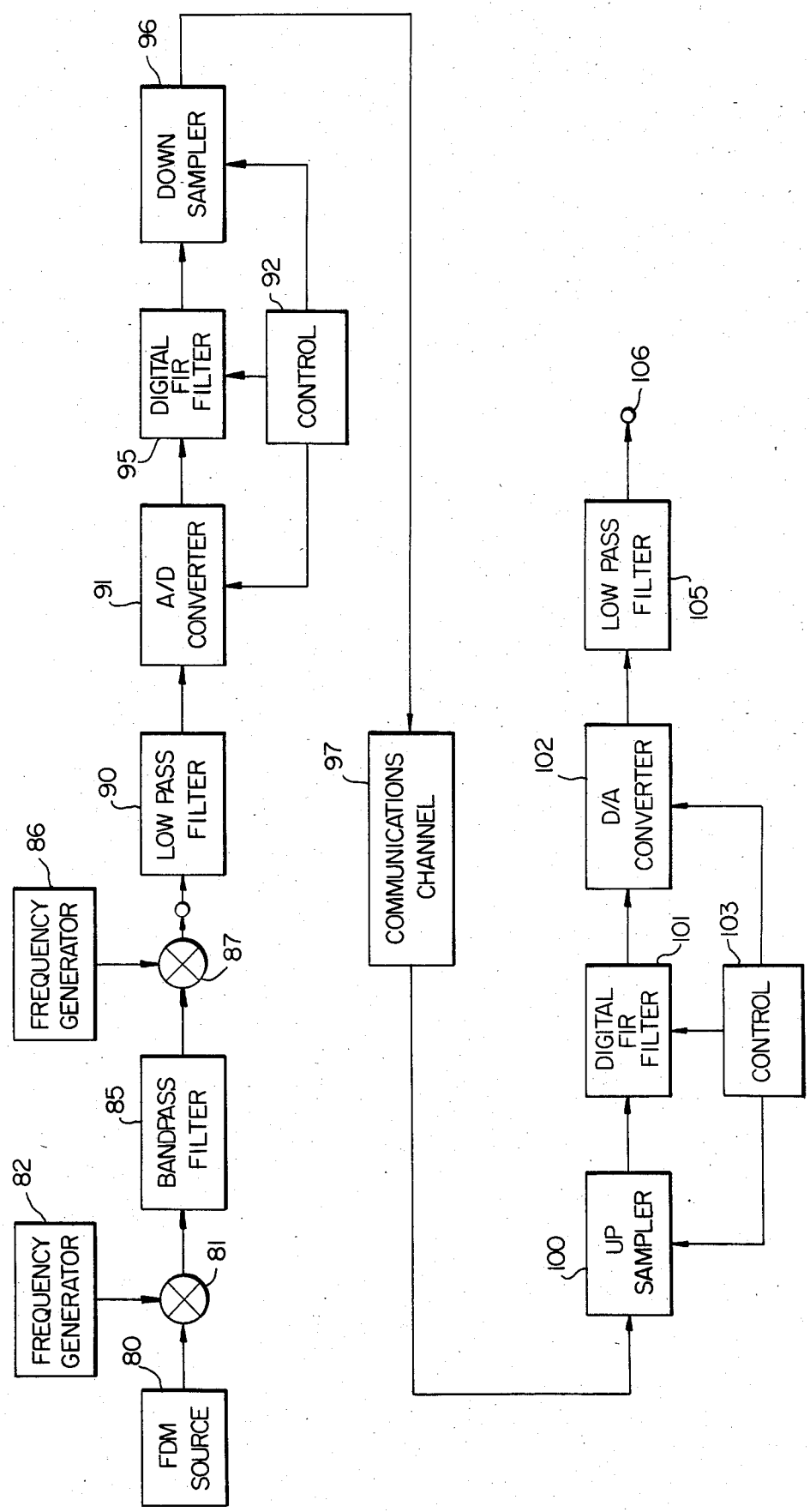
FIG. 8 is a block diagram of an FDM dechanneler circuit incorporating the method of our invention.

FIG. 8 is a block diagram of an apparatus for performing th dechanneling process. Its operation will be explained with the aid of FIG. 7, which illustrates the signals present at various locations within the apparatus as the process progresses. Let FIG. 7A represent an FDM signal applied from source 80 to a modulator 81.

The FDM signal will be assumed to be a 12-channel narrowband signal, with each channel having a width of 4000 hz. Let it be further assumed that we desire to dechannel signal number IV, located in the 12-16 Khz frequency band. Frequency generator 82 is adjusted according to the channel which has been selected. In general, the frequency should be that which will translate the center of the selected channel to the center of the passband of bandpass filter 85. In our particular example, filter 85 will be presumed to have a pass band of 8 Khz, centered at 455 kHz. The signal from frequency generator 82 would accordingly be 441 Khz. FIG. 7B illustrates the signal emerging from modulator 82, and FIG. 7C represents that signal after it has been filtered by bandpass filter 85. From the previous discussion, it is apparent that the filtering process has introduced some group delay distortion into this signal, but only near the extreme edges of the signal. Because the signal of interest resides only at the center of the signal, no group delay distortion has been introduced into the signal of interest.

A second frequency generator 86 is adjusted to translate the signal down to a significantly lower frequency where it may be more efficiently digitized. If frequency generator 86 provides an output of 461 Khz to modulator 87, the signal is translated to a center at 6 Khz as illustrated in FIG. 7D. The redundant high order frequencies are removed by lowpass filter 90, which has a cutoff frequency on the order of 10 Khz.

Figure 3:
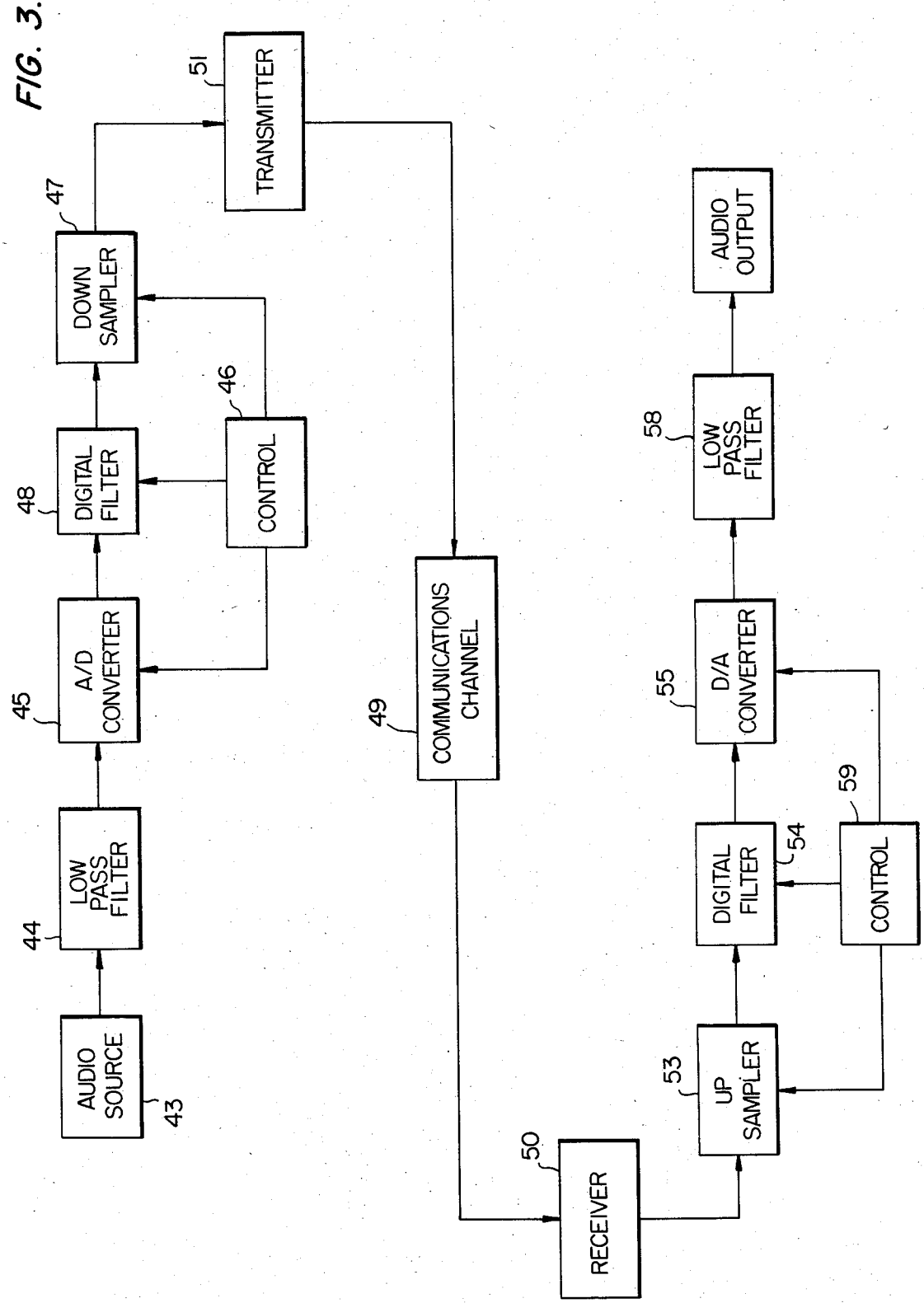
FIG. 3 is a block diagram representation of a communications system incorporating our invention.

The remainder of the process is substantially identical to that previously described with respect to FIG. 3. Analog-to-digital converter 91 digitizes the signal at some convenient bit rate. For example, control 92 might provide a clocking signal to digitize the signal at a 24K sample rate. FIR filter 95, which as previously stated may easily be constructed with essentially zero group delay distortion, passes the 4-8 Khz portion of the signal, as illustrated in FIG. 7E. The signal may be downsampled with downsampler 96 by a factor of three and the result, illustrated in FIG. 7F, may be transmitted to the intended destination over communications channel 97.

Following reception of the digital signal at its destination, a substantially reverse process reconstructs the desired analog signal. Upsampler circuit 100 receives incoming data from the commnications channel 97 and timing information from control 103. Two zero-value samples interspersed between each data sample raises the sample rate by a factor of three to produce a 24K sample signal as illustrated in FIG. 7G. FIR filter 101 digitally filters this signal to remove all but the desired signal, which repeats at 24K intervals as illustrated in FIG. 7H. Digital to analog converter 102, under direction from control 103, converts the digital signal back to analog. Finally, this signal is passed through the low pass filter 105 to yield the reconstructed original signal as illustrated in FIG 7I. In accordance with the teaching of our invention, this signal has been dechanneled from its original FDM source, digitized, transmitted to its intended destination, returned to its analog form, all without introduction of group delay distortion.

We have described a process and apparatus capable of eliminating differential group delay from a transmitted message. The specific embodiments, however, illustrate only the principles of our invention. Numerous modifications and adaptations will be readily apparent to those skilled in the art without departing from the spirit and scope of the present invention.

We claim:
1. A process for reducing group delay distortion in an analog signal communication, comprising:
   (a) filtering a first analog signal, a predetermined portion of which comprises a signal of interest, with a low pass filter having a cutoff frequency substantially greater than the signal of interest, said frequency being at least that necessary to preclude group delay distortion in said signal of interest;
   (b) converting said filtered analog signal to digital form at a rate equal to or greater than two times the filtered signal bandwidth;
   (c) filtering said digital signal with a digital filter having a cutoff frequency substantially equal to the signal of interest;
   (d) down sampling said filtered digital signal to a transmission sample rate approximately equal to twice the bandwidth of the signal of interest;
   (e) up sampling said down sampled signal to a rate equal to or greater than two times the transmission sample rate;
   (f) filtering said up sampled signal with a digital filter having a cutoff frequency substantially equal to the signal of interest;
   (g) digital-to-analog converting said filtered up sampled signal to produce a second analog signal; and
   (h) filtering said second analog signal with an analog low pass filter having a cutoff frequency substantially greater than the signal of interest, said frequency being at least that necessary to preclude group delay distortion in said signal of interest.

2. The proces of claim 1, wherein the pass band of said first analog filter is at least twice the bandwidth of the signal.

3. The process of claim 2, wherein filtering said digital signal includes filtering said digital signal with a finite impulse response filter.

4. An improved process for converting a digital signal having a given bit rate to an analog signal of a given bandwidth without introducing group delay distortion, comprising the steps of:
   (a) up sampling said digital signal to a rate substantially greater than said given bit rate;
   (b) filtering said upsampled digital signal with a digital filter having a pass band substantially equal to said given bandwidth;
   (c) convering said filtered digital signal to an analog signal; and
   (d) filtering said analog signal with an analog filter having a pass band substantially greater than said given bandwidth, said pass band being at least that necessary to preclude group delay distortion in said analog signal.

5. The process of claim 4, wherein the bit rate of said up sampled digital signal is at least twice said given bit rate.

6. The process of claim 5, wherein filtering said digital signal includes filtering said digital signal with a finite impulse response filter.

* * * * *